(12) United States Patent
Wang et al.

(10) Patent No.: US 6,745,034 B2
(45) Date of Patent: Jun. 1, 2004

(54) APPARATUS, AND ASSOCIATED METHOD, FOR ADAPTIVELY SELECTING A HANDOFF THRESHOLD IN A RADIO COMMUNICATION SYSTEM

(75) Inventors: Shu-Shaw Wang, Arlington, TX (US); Marilynn Green, Pomona, NY (US)

(73) Assignee: Nokia Corporation, Espoo (FI)

( * ) Notice: Subject to any disclaimer, the term of this patent is extended or adjusted under 35 U.S.C. 154(b) by 558 days.

(21) Appl. No.: 09/746,129

(22) Filed: Dec. 22, 2000

(65) Prior Publication Data

US 2002/0082012 A1 Jun. 27, 2002

(51) Int. Cl.⁷ .................................................. H04Q 7/20
(52) U.S. Cl. .................. 455/441; 455/437; 455/438; 455/440
(58) Field of Search ................................. 455/436, 437, 455/438, 439, 440, 441, 456.1, 67.11, 226.1, 226.2; 370/331, 332, 333, 334

(56) References Cited

U.S. PATENT DOCUMENTS

| 5,239,667 A | * | 8/1993 | Kanai ............................ 455/10 |
|---|---|---|---|
| 5,457,810 A | | 10/1995 | Ivanov et al. ............... 455/33.2 |
| 5,513,380 A | | 4/1996 | Ivanov et al. ............... 455/33.2 |
| 5,867,785 A | * | 2/1999 | Averbuch et al. ........... 455/436 |
| 6,049,715 A | * | 4/2000 | Willhoff et al. ............. 455/436 |
| 6,351,642 B1 | * | 2/2002 | Corbett et al. .............. 455/442 |
| 6,400,953 B1 | * | 6/2002 | Furukawa .................... 455/442 |
| 6,564,057 B1 | * | 5/2003 | Chun et al. .................. 455/437 |
| 2001/0006514 A1 | | 7/2001 | Park ........................... 370/331 |

FOREIGN PATENT DOCUMENTS

EP          0 897 251 A2     2/1999

* cited by examiner

*Primary Examiner*—Erika Gary
*Assistant Examiner*—Temica M. Davis
(74) *Attorney, Agent, or Firm*—Federico Fraccaroli

(57) ABSTRACT

Apparatus, and an associated method, dynamically selects values of thresholds to be used in a determination of whether to request a handoff of communications between serving and target base stations of a cellular, or other, radio communication system. Because the thresholds are dynamically determined, the thresholds are selectable responsive to communication characteristics about the mobile stations with which communications are to be handed off.

19 Claims, 4 Drawing Sheets

APPARATUS, AND ASSOCIATED METHOD, FOR ADAPTIVELY SELECTING A HANDOFF THRESHOLD IN A RADIO COMMUNICATION SYSTEM

The present invention relates, generally to a manner by which to facilitate selection of handoff of communications with a mobile station by a serving communication station to a target communication station, such as the serving and target base transceiver stations of a cellular communication system. More particularly, the present invention relates to apparatus, and an associated method, by which adaptively to select the threshold at which the handoff of communication is requested. Because of the adaptive selection of the threshold at which the request is initiated, an appropriate threshold is selectable irrespective of the communication characteristics of the cells or other geographical areas defined by the serving and target communication stations.

BACKGROUND OF THE INVENTION

A communication system is formed, at a minimum, of a sending station and a receiving station interconnected by way of a communication channel. The communication channel provides a communication path by which information originated at the sending station is communicated to the receiving station. Communication systems have been developed, and implemented, to communicate a wide variety of types of information between a large variety of types of sending and receiving stations.

Advancements in communication technologies have permitted new types of communication systems to be developed and implemented. A radio communication system is exemplary of a type of communication system. In a radio communication system, the sending station, a radio transmitter, transmits information upon a radio communication channel to a receiving station formed of a radio receiver. The radio communication channel is defined upon a radio link formed between the radio transmitter and receiver. The conventional need for a wireline connection to interconnect the sending and receiving stations is obviated due to the formation of the radio communication channel upon a radio link. A radio communication system permits, as a result, increased communication mobility. Sending and receiving stations of a radio communication system are operable to send and to receive information, respectively, at positions in which communications by a conventional wireline system would be impractical or impermissible.

A cellular communication system is a type of radio communication system which provides multiple numbers of users concurrently to communicate therethrough. Generally, such a communication system is referred to as a cellular communication system as the geographical area over which the cellular communication system is installed is divided into regions, referred to as cells. The cells are each defined by a fixed-site transceiver, referred to as a base transceiver station. The base transceiver stations are positioned at locations such that the cells defined thereby encompass the geographical area in which the cellular communication system is to be operable.

Radio communications are effectuable with a mobile station positioned at any location within the area encompassed by the cellular communication system. Generally, a mobile station communicates with the base transceiver station which defines the cell in which the mobile station is positioned. If the mobile station moves to be repositioned at another cell, a procedure, referred to as a handoff, is effectuated. Handoffs of communications are sometimes also effectuated due to channel traffic conditions or channel communication conditions irrespective of the repositioning of the mobile station.

In a handoff procedure, communications of the mobile station, initially with a first base transceiver station, referred to as the serving station, are transferred to another base transceiver station, referred to as a target station. Once the transfer is completed, subsequent communications of the mobile station are carried out with the target base transceiver station. Successive handoffs, from one base transceiver station to another, can occur as the mobile station travels through successive cells.

Handoff of communications from a serving base station to a target base station permits communications by a mobile station to continue even though the mobile station travels out of communication range with the base station which initially forms the serving base station. When in an active communication session, uninterrupted communications are generally possible with a mobile station as a handoff is effectuated from a serving base station to a target base station. And, the handoff occurs both without the active intervention of a user of the mobile station as well as, generally, also without the knowledge of the user that a handoff has occurred.

In different cellular communication systems, different manners are utilized by which to select when to effectuate handoff of communications with a mobile station from a serving base station to a target base station. In some systems, determination of when to initiate handoff of communications is performed entirely at the network infrastructure portion of the communication system. In other systems, at least some of the information utilized in the determination of when to initiate handoff of communication is determined at, or otherwise provided by, the mobile station. In some cellular communication systems, a procedure referred to as MAHO (mobile-assisted handoff) is utilized in the determinations of when to initiate handoff of communications.

In an exemplary MAHO procedure, measurement is made at selected intervals, by a mobile station of signal indicia of signals transmitted by the serving base station and one, or more, potential target base stations. The signal indicia is formed, for instance of signal strength measurements of the signals. Responsive to such measurements a report is made by the mobile station to the network infrastructure to request, when appropriate, a handoff of communications from the serving base station to a selected target base station. Thereafter, handoff of communications is selectably effectuated.

Communication characteristics might differ, however, in differing ones of the cells. In some cells, for instance, relatively low levels of fading are exhibited. In other cells, conversely, relatively high levels of fading might be exhibited.

Conventionally, uniform thresholds are utilized in the handoff procedures irrespective of the communication characteristics of the cells defined by serving and potential target base stations. However, due to the different communication characteristics of the different cells, the uniform thresholds might cause selection of initiation of a handoff of communications when a handoff is not necessary. And, also, selection might be made not to initiate handoff of communications when a handoff is necessary. If a manner could be provided by which adaptively to select the thresholds, responsive to communication characteristics, used in handoff procedures, improved communications in a cellular communication system would be possible.

It is in light of this background information related to handoff procedures in a radio communication system that the significant improvements of the present invention have evolved.

SUMMARY OF THE INVENTION

The present invention, accordingly, advantageously provides apparatus, and an associated method, by which to facilitate selection of handoff of communications with a mobile station by a serving communication station to a target communication station.

Through operation of an embodiment of the present invention, a manner is provided by which adaptively to select the threshold at which the handoff of communications is requested. An appropriate threshold is selectable irrespective of the communication characteristics of the geographical area in which the mobile station is positioned. Selection of the threshold to be used in the handoff procedures is responsive, in part, to the communication characteristics of the geographical area is defined by the serving and target communication stations. By adaptively selecting the threshold at which the request is initiated, an appropriate threshold is determined thereby to ensure that selection of the handoff of communications between serving and target communication stations is properly made.

If the communication characteristics exhibit minor amounts of fading, the threshold is set to be of appropriate levels. And, when the communication characteristics exhibit significant amounts of fading, the threshold is correspondingly set to be of other appropriate levels.

In one aspect of the present invention, a manner is provided by which to perform adaptive handoff of communications between a serving communication station and a target communication station. By performing the adaptive handoff of communications of an embodiment of the present invention, unnecessary handoffs of communications are reduced while also maintaining a possibility of an inadvertent communication interruption, such as a dropped call in a cellular communication system. Indications of the positioning of the mobile station and indications of values of selected RF (radio frequency) signal data are utilized to adjust dynamically a handoff threshold. Values of indications of the location at which the mobile station is positioned are requested only when an initial indication that a handoff of communications should be requested occurs. Thereby, continuous tracking of the position of the mobile station along with the corresponding privacy concern, is obviated.

Problems associated with conventional use of a fixed, nonadjustable handoff threshold are avoided. Conventionally, if the threshold is selected to be of too small value, unnecessary handoffs result. Unnecessary handoffs increase the amounts of signaling generated during operation of the communication system. And, if the value of the fixed threshold is selected to be too large, a necessary handoff might not be performed, resulting in an inadvertent communication termination. By dynamically altering the value of the handoff threshold responsive to, variously, the position at which the mobile station is located and RF signal statistics, the number of unnecessary handoffs which are performed is reduced while maintaining a low probability of an inadvertent communication interruption, all in contrast to conventional handoff procedures.

In another aspect of the present invention, a hysteresis threshold formed of a set of values is dynamically selected. The values are selected according to a mapping of the position at which the mobile station is located and according to mean and standard deviations of measured RF propagation data.

In one implementation, the handoff threshold is adaptively selected for communications in a cellular communication system installed throughout a geographical area. Signal strength measurements are made by a mobile station of signals, such as pilot signals, generated by a serving base station and one or more potential base stations. When differences between the values of the signals generated by the serving and target base stations exceed initial threshold values, a preliminary indication is made that a handoff of communications should be effectuated. Once such an initial determination is made, a request is then made to determine mobile station indicia, of both position and velocity, of the mobile station. If the mobile station is not moving, is or moving at a velocity beneath a selected level, a handoff request is generate responsive to the determinations made with respect to the initial threshold values. If, however, the mobile station is traveling at velocity greater than the selected value, analysis is further made of RF propagation data associated with the environment about the mobile station. Responsive to such additional information the hysteresis threshold values are altered. A determination is then made as to whether a handoff of communications should be performed by comparing values of the differences, earlier determined, between the values of signals generated by the serving and target base stations and the newly-decided threshold values. If a handoff of communications is needed, as determined by the subsequent comparison, a request for handoff of communications is requested.

In these and another aspects, therefore, apparatus, and an associated method, is provided for a radio communication system in which a mobile station is operable to communicate with a serving fixed-site communication station and to communicate with a target fixed-site communication station subsequent to effectuation of a communication handoff thereto. Selection of when to initiate the effectuation of the communication handoff is facilitated. A movement determiner is coupled to receive indications of differences between signal indicia associated with signals generated by the serving fixed-site communication station and signal indicia associated with signals associated with signals generated by the target fixed-site communication station. The movement determiner is selectably operable at least when the indications of the differences are beyond a first threshold set to determine movement indicia associated with the mobile station. A second threshold set calculator is coupled to receive indications of the movement indicia determined by the movement determiner. The threshold set calculator calculates second threshold set values when the movement indicia indicates selected movement of the mobile station. A second threshold set comparator is coupled to receive indications of the second threshold set values and indications of the differences between the signal indicia associated with the signals generated by the serving and the target fixed-site transceivers. The second threshold set comparator compares differences between the signal indicia and the second threshold set values. A handoff request selector is coupled to the second threshold set comparator. The handoff request selector selectably requests handoff of communications to the target fixed site communication station responsive to comparisons made by the second threshold set comparator.

The present invention will be better understood when read in light of the accompanying drawings which are described in the detailed description hereinbelow and in light of the claims appended hereto.

DETAILED DESCRIPTION OF THE PREFERRED EMBODIMENTS

Figure 1:
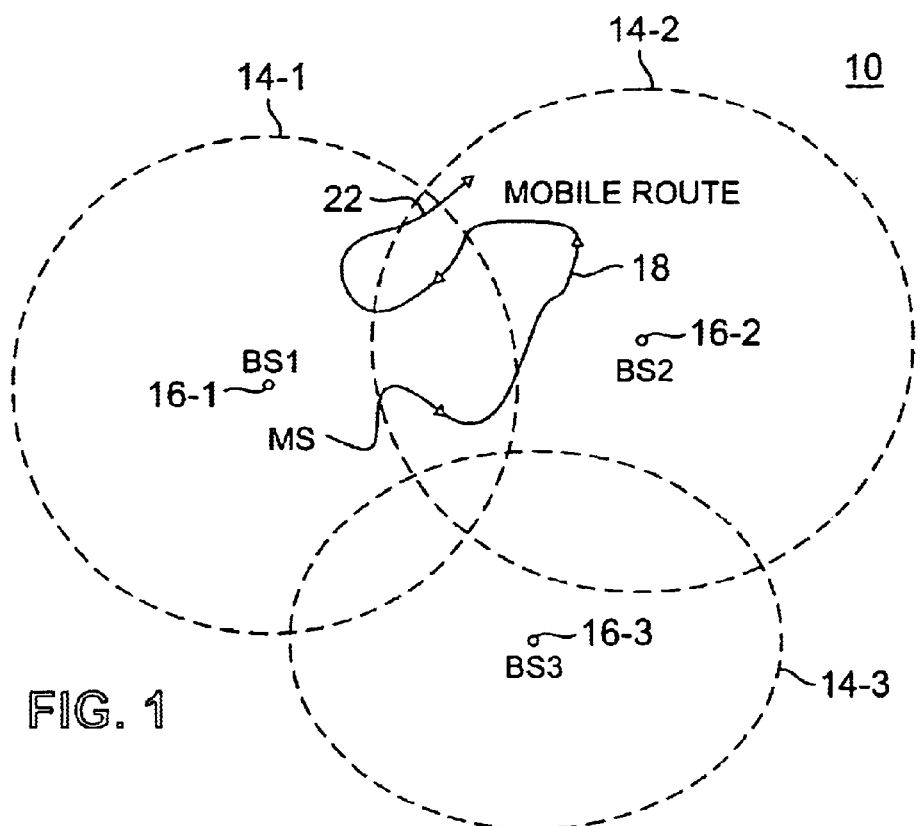
FIG. 1 illustrates a functional representation of several cells of an exemplary cellular communication system and a path of exemplary movement of a mobile station operable in a cellular communication.

Referring first to FIG. 1, a portion of a cellular communication system, shown generally at 10 is shown. The system provides for communications with a mobile station 12. The cellular communication system is installed to encompass a geographical area. When the mobile station is positioned within the geographical area, a user of the mobile station is able to communicate voice, as well as nonvoice, data through operation of the mobile station. While the following description shall describe operation of an embodiment of the present invention with respect to a cellular communication system, it should be understood that operation of an embodiment of the present invention is similarly also possible in other types of communication system sin which communication handoffs with the mobile station are effectuated.

Three cells 14, here designated as 14-1, 14-2, and 14-3, are shown in the figure. Each of the cells is defined by a base transceiver station 16 which forms a portion of the network infrastructure of the communication system. The cell 14-1 is defined by a base transceiver station (BTS) 16-1. The cell 14-2 is defined by a second base transceiver station 16-2. And, the cell 14-3 is defined by a base transceiver station 16-3. The base transceiver stations are illustrated at the centers of the respective cells which are defined therefrom. In an actual implementation, the base stations can be, and regularly are, positioned at other locations, such as in a sector cell arrangement. When a mobile station is positioned in a cell defined by one of the base transceiver stations, the mobile stations generally is operable to communicate with that base transceiver station. The cell within which the mobile station is positioned is referred to as the serving cell, and the base station which defines the serving cell is referred to as the serving base station.

As the mobile station travels out the serving cell and into another cell, a handoff of communications is effectuated with another base transceiver station to permit continued communications by the mobile station by way of the cellular communication system. The cell to which the communications are handed-off is referred to as a target cell, and the base station which defines the target cell is referred to as the target base station. Thereafter becomes the serving cell and the base transceiver station which defines the new serving cell becomes the serving base station.

Handoff procedures involve determining when a handoff of communications should be effectuated and to which base station the handoff should occur. Measurements of signal indicia are made at selected intervals of signals generated by the serving base station as well as signals generated by one or more other base stations to which a handover of communications might be effectuated. When the signal differences between the signals generated by the serving and target base stations indicate that a handoff of communications should be effectuated, a request for a handoff of communications is made. A path 18 is exemplary of movement of the mobile stations through the geographical area encompassed by the communication system. As shown, the mobile station is initially positioned in the cell 14-1. The path 18 extends through an area 22 at which the cells 14-1 and 14-2 overlap. Thereafter, the paths extend into an area encompassed only by the cell 14-2.

Figure 2:
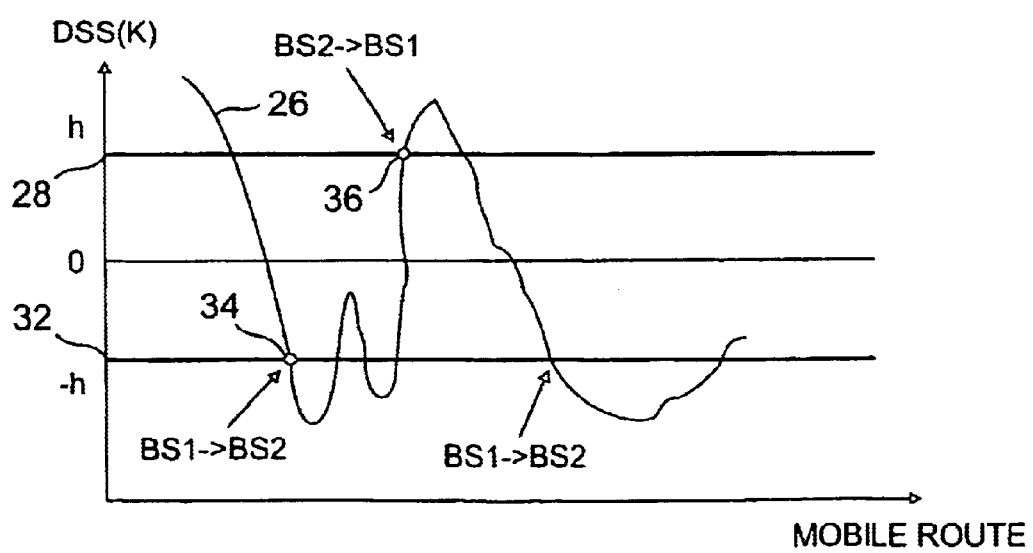
FIG. 2 illustrates a graphical representation of exemplary differences between signal strengths of signals generated by a serving and a target base station which defines two of these cells shown in FIG. 1.

FIG. 2 illustrates a plot 26 representing exemplary differences between values of signal indicia, here strength levels, of pilot, or other signals, sent by the serving base station 16-1 and the target base station 16-2. Values of the difference at different locations along the path 18 vary, generally, according to the position at which the mobile station is located. Two values, h, designated at 28 and −h, designated at 32 are also shown in the figure. The values 28 and 32 define an upper bound value and a lower bound value of a threshold set. A set of values is utilized in handoff procedures to provide a hysteresis set. That is, the thresholds are utilized in the determination of when to request a handoff. Once an appropriate threshold is passed, a handoff request is triggered. Another handoff request is not requested until the other threshold bound value is passed.

At the point 34, the difference in signal strengths of the signals generated by the serving and target base stations exceeds the lower bound value 34. A handoff request is triggered responsive to the differences exceeding the lower bound value 32. Subsequent crossings of the lower the bound value do not retrigger another handoff request until the differences exceed the upper bound value 28, here at the point 36. Generally, the probability of a handoff is designed to be maximized at a cell boundary.

Use of a static, i.e., unchanging, set of hysteresis values irrespective of the communication conditions about the mobile station might cause a handoff request to be generated when unnecessary. Or, a handoff request might not be generated when a handoff is needed.

An embodiment of the present invention provides for dynamic selection of the upper and lower bounds of a hysteresis threshold set, determined responsive, in part to communication conditions about the mobile station. Thereby, a handoff request is more likely not to be made unnecessarily and a handoff request is less likely not to be generated when necessary.

Referring back again to FIG. 1, boxes 42 are shown to form portions of the mobile stations 12, the base transceiver stations 16, and the base station controller 20. The boxes 42 indicate positioning of an embodiment of the present invention. Various functional elements of an embodiment of the present invention are positioned at any of the indicated elements, or elsewhere, to provide adaptive threshold levels from which to select when to initiate a request for handoff of communications between a serving base station and a target base station.

Figure 3:
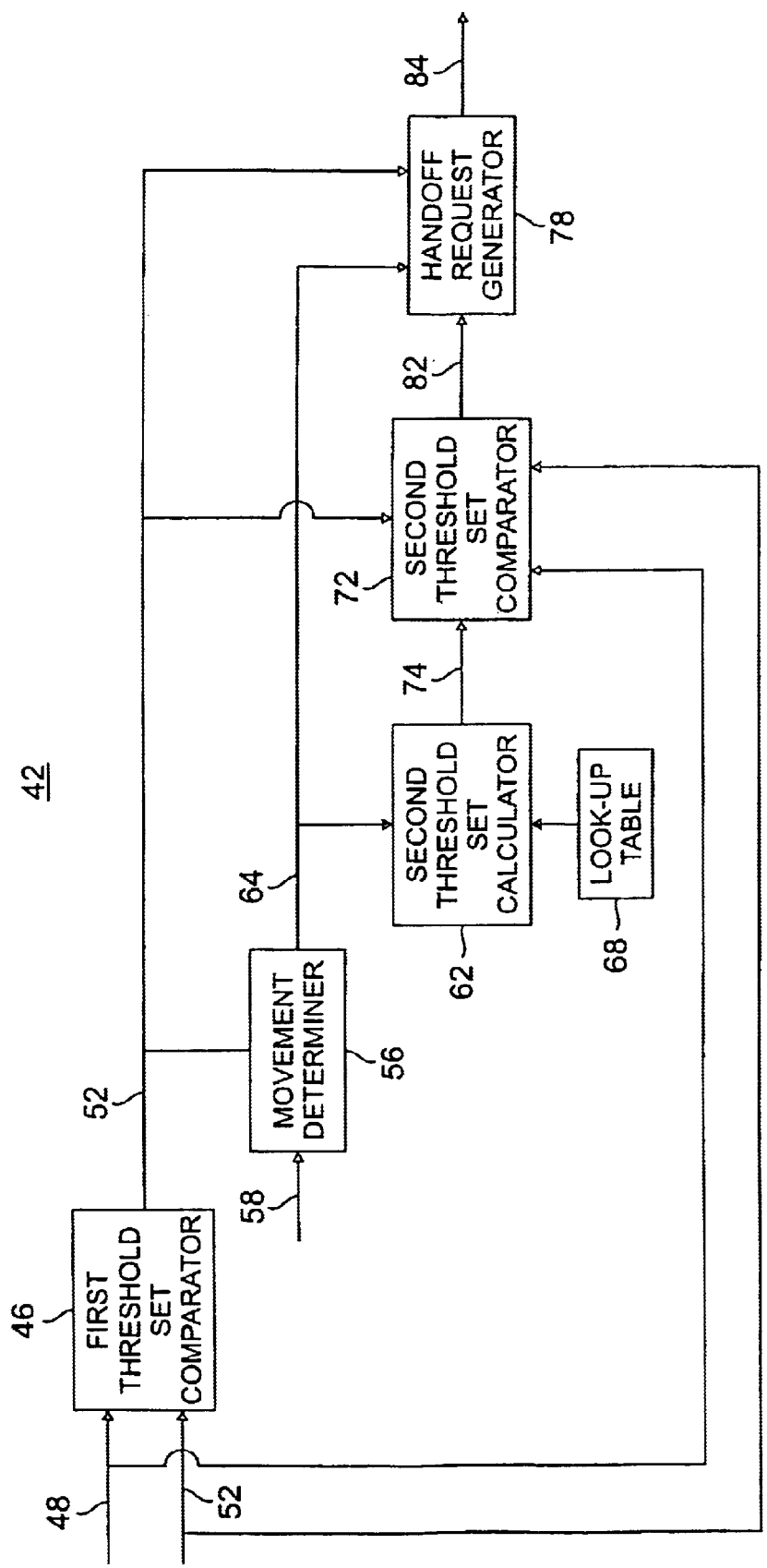
FIG. 3 illustrates a functional block diagram of the apparatus of an embodiment of the present invention.

FIG. 3 illustrates the functional elements of the apparatus 42 of an embodiment of the present invention. The elements are positioned at the mobile station 12, a base transceiver station 16, a base station controller 20, or elsewhere as noted previously with respect to FIG. 1. The apparatus selectably causes initiation of a handoff request of communications with the mobile station from a serving base station to a target base station. Dynamically-determined threshold values are utilized in the selection procedure, thereby to permit the triggering of the handoff request to be responsive, in part, to communication conditions about the mobile station. Reduced numbers of unnecessary handoff request are generated while also not increasing the number of inadvertent call drops, or other inadvertent communication interruptions, through the installation and operation of the apparatus 42.

A first threshold set comparator 46 forms a portion of the apparatus. The comparator is coupled to receive indications of the signal indicia associated with the serving base station and one or more target base stations. Receipt of the indicia is here shown by way of the lines 48 and 52. The comparator 46 is operable, similar to conventional schemes by which selectably to trigger a handoff request responsive to differences between the values of the signal indicia of the signals of the serving and target base stations.

If the differences exceed upper or lower bound values, an indication is generated by the comparator, here on the line 52. The line 52 is coupled to a movement determiner 56. The movement determiner also selectably receives velocity and position indicia associated with the mobile station, communication with which are to be handed off. The velocity and position indicia are here provided to the movement determiner by way of the line 58. The velocity indicia include both a speed component and a direction component. The movement determiner is operable to determine whether movement of the mobile station exceeds a selected movement threshold.

Indications of the determinations made by the movement determiner are provided to a second threshold set calculator 62, here by way of the line 64. Responsive to indications of selected movement of the mobile station, the second threshold set calculator operates to form a second threshold set of values of both an upper bound value and a lower bound value. The calculator 62 is further operable to receive indications of propagation characteristics about the mobile station. Here, the propagation characteristics include values of the average signal strength of the receiver (RSS) mean. The standard deviations thereof are also provided. Such indications are here shown to be provided to the second threshold set calculator by way of the line 66. The line 66, in the exemplary implementation, is coupled to a look-up table 68 formed at a storage device. The look-up table stores values of the RSS mean and standard deviation values.

Indications of the values of the upper and lower bound values calculated by the calculator 62 are provided to a second threshold set comparator 72 by way of the line 74. The indications of the values of the signal indicia of the serving and target base stations are also provided to the comparator 72. And, an indication generated by the first threshold set comparator 46 is provided to the comparator on the line 52. When the indication generated on the line 52 indicates that values of the signal indicia exceed an upper or lower bound value of the first threshold set, the second threshold set comparator is operable to compare the differences between the values of the signal indicia with the upper and lower bound values of the second threshold set. If the comparator indicates that the differences exceed the upper or lower bound values of the second threshold set, an indication is provided to a handoff request generator 78 by way of the line 82. A handoff request generator generates a handoff request responsive thereto, here on the line 84.

The handoff request generator 78 is also coupled to the lines 52 and 64. The handoff request generator is separately operable also to generate a handoff request when the value of the signal indicia is beyond the upper or lower bound values of the first threshold set comparator and the movement determiner indicates that movement of the mobile station is less than the selected level. A handoff request is thereby also generated in conventional manner if the movement of the mobile station is less than the selected threshold.

Figure 4:
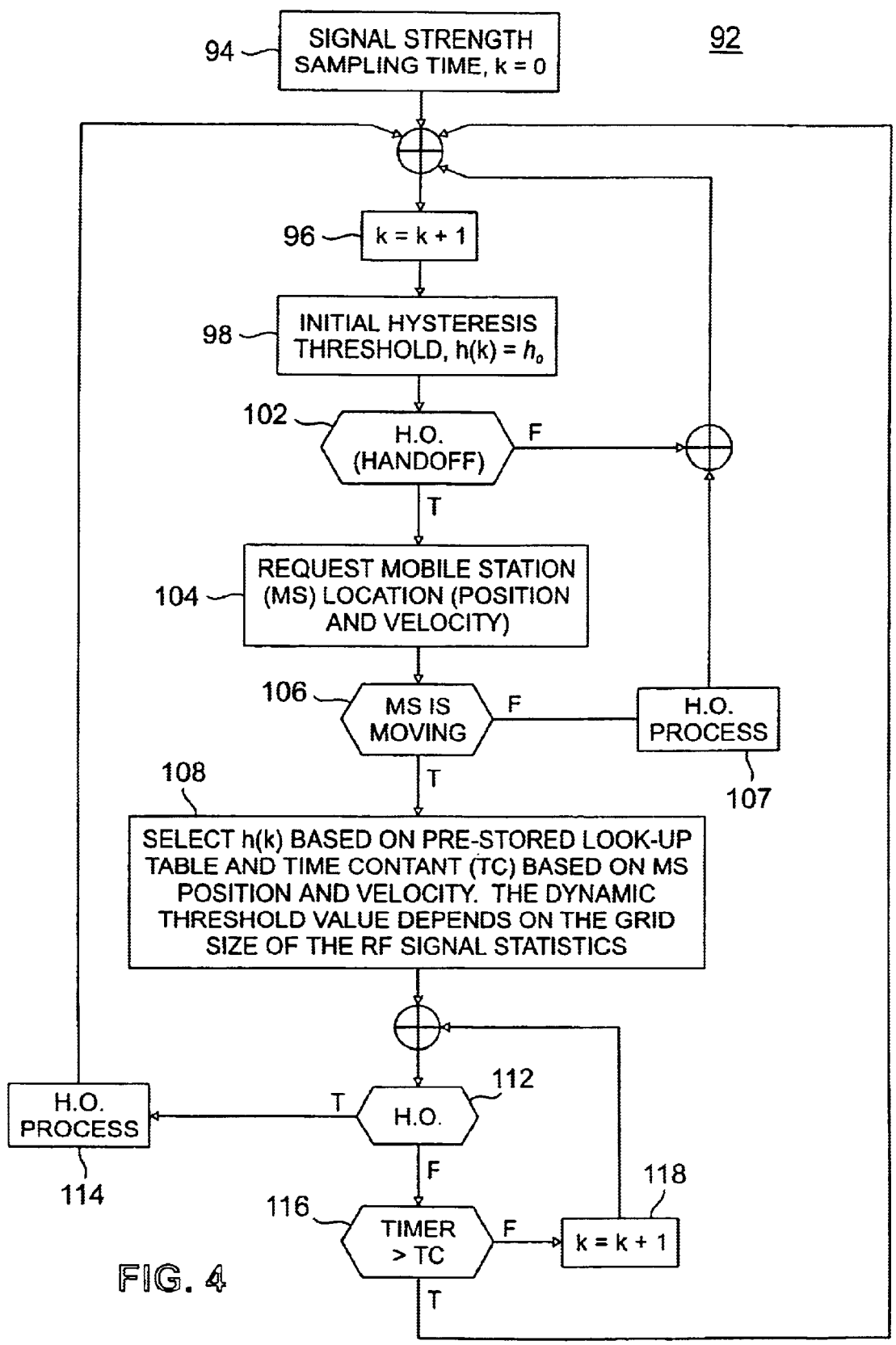
FIG. 4 illustrates a method flow diagram listing the method of operation of an embodiment of the present invention.

FIG. 4 illustrates a method, shown generally at 92, of an embodiment of the present invention. The method is operable adaptively to select threshold values used in handoff procedures to trigger a request for a handoff of communications with a mobile station from a serving base station to a target base station. The method is carried out, for instance, by the apparatus 42 shown in FIGS. 1 and 3. That is to say a hysteresis threshold is provided in which the values thereof dynamically change according to the location of the mobile station and RF (radio frequency) propagation data about the mobile station.

First, and as indicated by the block 94, a sampling time k is set to zero. The value of k defines a signal strength sampling time. The sampling time is then incremented, indicated by the block 96.

Then, and as indicated by the block 98, an initial hysteresis threshold h(k) of values $h_0$, formed of an initial upper bound value and lower bound value, are defined to be the initial handoff threshold. The initial hysteresis threshold values are utilized at the decision block 102 to determine whether a handoff of communications should be requested from the serving base station to a target base station. If the differences between the signal strengths of the serving and target base stations signals indicate that a handoff is not required, the F branch is taken therefrom back to the block 96. If, conversely, a determination is made that a handoff should be requested the T branch is taken to the block 104.

At the block 104, a request is made for indicia associated with the position and velocity of the mobile station. The velocity indicia include both a speed component and a directional component. The indicia is requested, and provided, only when the initial handoff request is generated at the decision block 102. Thereby, calculations associated with determining such indicia as well as privacy issues otherwise associated with a constant determination of the positional indicia of the mobile station are avoided. The indicia are provided without need to provide an identifier uniquely associated with the mobile station. A determination is then made, indicated by the decision block 106, as to whether the mobile station is moving at least in a selected manner. If not, the F branch is taken to the block 107 at which a handoff process continues to effectuate a communication handoff process. If, conversely, the mobile station is moving in the selected manner, such as at a velocity greater than a threshold value, a T branch is taken to block 108.

At the block 108, a new hysteresis threshold is set, and a second threshold set is selected. In the exemplary implementation, the values of the second set are retrieved from a look-up table and a time constant (TC), based upon the position and velocity of the mobile station. Also, in the exemplary implementation, the dynamic threshold values, so-selected, are dependent upon a grid size of RF (radio frequency) signal statistics.

Thereafter, and as indicated by the decision block 112, a determination is made whether to request a handoff of communications, utilizing the dynamically-selected threshold values. If a request for handoff is selected, the T branch is taken to the block 114. At the block 114, a handoff process is continued. If, conversely, selection is made at the decision block 112 not to select a request for handoff of communications, the F branch is taken to the decision block 116.

At the decision block 116, a determination is made as to whether time period greater than the time constant has expired. If not, the F branch is taken to the block 118, and the sampling time is incremented. Thereafter, a branch is taken back to the decision block 112. If, conversely, a determination is made at the decision block 116 that the time has exceed the time constant the T branch is taken back to the block 96.

Figure 5:
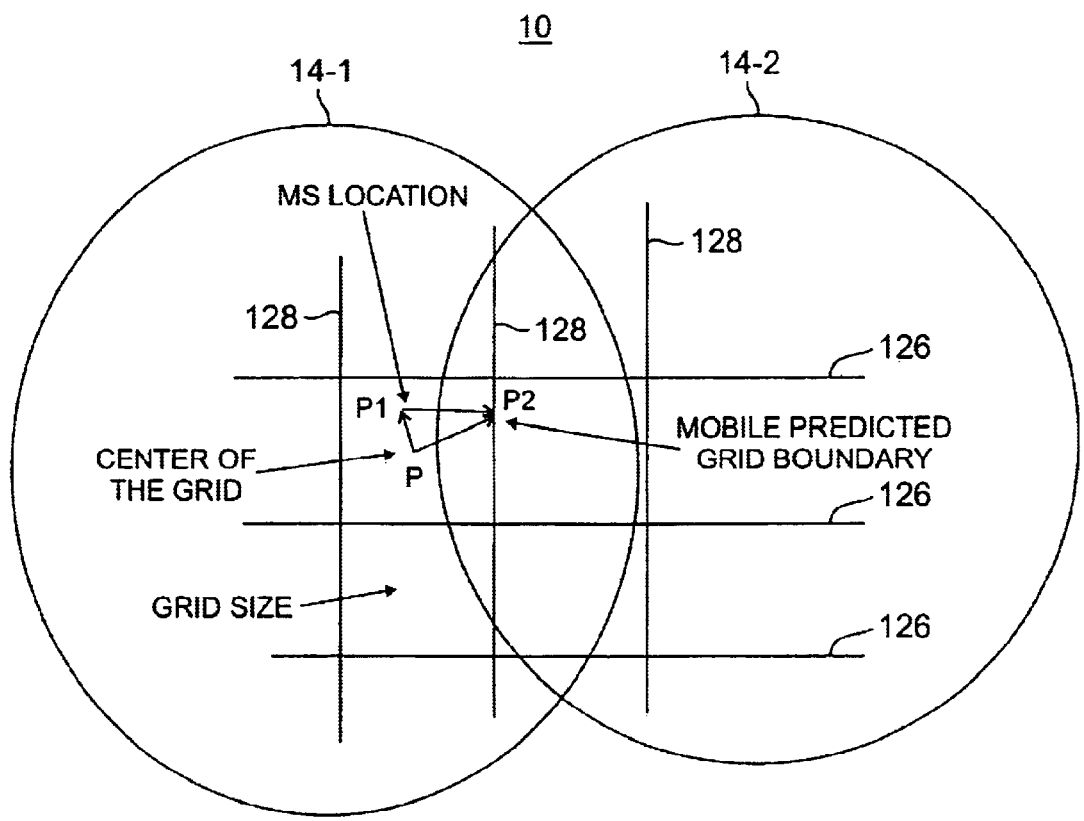
FIG. 5 illustrates a representation of a manner by which a cell is divided during operation of an embodiment of the present invention.

FIG. 5 illustrates two cells, cells 16-1 and 16-2, which are defined in the cellular communication system 10, portions of which are shown in FIG. 1. Here, horizontal and vertical lines 126 and 128 are added to define grids. A center point P of one of the grids so-formed is indicated in the figure. A position of the mobile station 12 is also illustrated in the grid. Vectors P1 and P2 are further shown in the figure. A vector, indicated in dash in the figure, represents predicted movement of the mobile station to a grid boundary, defined by a vertical line 128. Each grid unit has a measured RSS (average signal strength of the receiver) mean, and standard deviations of such values, for the serving base stations and neighboring base stations, including prospective target stations. The dynamically-adapted threshold value h(k) is developed from such mean and standard deviation. And, a time constant utilized at the method step 108 shown in FIG. 4 is derived from values of the position, speed, and heading of the mobile station.

Thereby, a manner is provided by which dynamically to select threshold values utilized in a handoff procedure. The threshold values are selected responsive to communication conditions about the mobile stations. Through operation of an embodiment of the present invention, unnecessary handoff requests are less likely to be generated while also not increasing the likelihood of a dropped call.

The previous descriptions are of preferred examples for implementing the invention, and the scope of the invention should not necessarily be limited by this description. The scope of the present invention is defined by the following claims.

What is claimed is:

1. In a radio communication system in which a mobile station is operable to communicate with a serving fixed-site communication station and to communicate with a target fixed-site communication station subsequent to effectuation of a communication hand-off thereto, an improvement of apparatus for facilitating selection of when to initiate the effectuation of the communication hand-off, said apparatus comprising:

a movement determiner coupled to receive indications of differences between signal indicia associated with signals generated by the serving fixed-site communication station, signal indicia associated with signals generated by the target fixed-site communication station, said movement determiner selectably operable at least when the indications of the differences are beyond a first threshold set to determine movement indicia associated with the mobile station, the first threshold set formed of a first upper bound value and a first lower bound value;

a second threshold set calculator coupled to receive indications of the movement indicia determined by said movement determiner, the movement indicia determined by said movement determiner when the indications of the differences are beyond the first threshold set, said second threshold set calculator for calculating second threshold set values when the movement indicia indicates selected movement of the mobile station, the second threshold set values formed of a second upper bound value and a second lower bound value;

a second-threshold-set comparator coupled to receive indications of the second threshold set values and indications of the differences between the signal indicia associated with the signals generated by the serving and the target fixed-site transceivers, respectively, said second-threshold-set comparator for comparing the differences between the signal indicia and the second threshold set values, said second-threshold-set comparator selectably operable at least when the indications of the differences are beyond the first threshold set; and a handoff request selector coupled to said second-threshold set comparator, said handoff request selector for selectably requesting handoff of communications to the target fixed-site communication station responsive to comparisons made by said second-threshold-set comparator.

2. The apparatus of claim 1 further comprising a first-threshold-set comparator coupled to receive indications of the signal indicia associated with the signals generated by the serving fixed-site communication station and the signal indicia associated with the signals generated by the target fixed-site communication station, said first-threshold-set comparator for comparing values of the signals generated by the serving and target fixed-site communication stations and for indicating results of comparisons made thereat, at least when the comparison indicates differences beyond the first threshold set.

3. The apparatus of claim 2 wherein the indication of the differences between the signal indicia to which said movement determiner is coupled to receive are generated by said first-threshold-set comparator.

4. The apparatus of claim 1 wherein the signal indicia, associated with the signals generated by the serving and the target fixed-site communication stations, comprise signal strengths measured at the mobile station.

5. The apparatus of claim 1 wherein said movement determiner is operable only responsive to when the indications of the differences between the signal indicia associated with the signals generated by the serving and by the target fixed-site communication stations, respectively, are beyond the first threshold set.

6. The apparatus of claim 1 wherein, said movement determiner is operable to determine the movement indicia when the indication of the differences are above the first upper bound value and when the indications of the differences are beneath the first lower bound value.

7. The apparatus of claim 1 wherein the movement indicia determined by said movement determiner comprises a velocity, formed of a speed component and of a direction component.

8. The apparatus of claim 7 wherein said handoff request selector is further coupled to said movement determiner, said handoff request selector further requesting handoff of communications to the target fixed-site communication station when the velocity is less than a minimum level and the indications of the differences between the signal indicia associated with the signals generated by the serving and by the target fixed-site communication stations, respectively, are beyond the first threshold set.

9. The apparatus of claim 1 wherein said second threshold set calculator is further coupled to receive indications of propagation characteristics in an area at which the mobile station is positioned and wherein the second threshold set calculated thereat is further calculated responsive to values of the propagation characteristics.

10. The apparatus of claim 9 wherein the propagation characteristics to which said second threshold set calculator is coupled to receive comprises average signal strength values of the signals generated by the serving and by the target fixed-site communication stations, respectively.

11. The apparatus of claim 10 wherein the propagation characteristics to which said second threshold set calculator is coupled to receive comprises a standard deviation of the average signal strength.

12. The apparatus of claim 11 wherein said second threshold set calculator further calculates a time constant responsive to the movement indicia determined by said movement determiner and by the propagation characteristics to which said second threshold set calculator is coupled to receive.

13. The apparatus of claim 12 wherein the request for handoff of communications by said handoff request selector is further responsive to the time constant calculated by said second threshold set calculator.

14. The apparatus of claim 1 further comprising a memory device at which data forming a look-up table is stored, the look-up table having values representative at least of movement indicia, calculations made by said second threshold set calculator comprising accessing the look-up table.

15. In a method for communicating with a mobile station in a radio communication system, the mobile station operable to communicate with a serving fixed-site communication station and to communicate with a target fixed-site communication station subsequent to effectuation of a communication hand-off thereto, an improvement of a method for facilitating selection of when to initiate the effectuation of the communication hand-off, said method comprising:

selectably determining movement indicia associated with the mobile station when differences between signals generated by the serving fixed-site communication station and signals generated by the target fixed-site communication station are beyond a first threshold set, the first threshold set formed of a first upper bound value and a first lower bound value;

calculating second threshold set values when the movement indicia determined during said operation of determining indicates selected movement of the mobile station and the differences between the signals generated by the serving fixed-site communication station and the signals generated by the target fixed-site communication station are beyond the first threshold set, the second threshold set values formed of a second upper bound value;

comparing values of indications of the differences between the signal indicia associated with signals generated by the serving and the target fixed-site transceivers, respectively, and the second threshold set values calculated during said operation of calculating at least when the differences between the signals generated by the serving and the target fixed-site stations are beyond the first threshold set; and selectably requesting handoff of communications to the target fixed-site communication station responsive to comparisons made during said operation of comparing.

16. The method of claim 15 wherein the movement indicia determined during said operation of selectably determining comprises a velocity indicia, formed of a speed component and a direction component, and a position indicia indicating a position at which the mobile station is located.

17. The method of claim 16 wherein handoff of communication is further requested during said operating of selectably requesting handoff of communications when the velocity indicia is less than a minimum level and the indications of the differences between the signal indicia associated with the signals generated by the serving and by the target fixed-site communication stations are beyond a first threshold set.

18. The method of claim 16 wherein the second threshold set values calculated during said operation of calculating the second threshold set values are calculated further responsive to indications of propagation characteristics in an area at which the mobile station is positioned, indicated by the position indicia.

19. The method of claim 18 wherein the propagation characteristics comprise average signal strength values of the signals generated by the serving and by the target fixed-site communication stations, respectively.

* * * * *